(12) United States Patent
Takahashi et al.

(10) Patent No.: US 6,441,325 B2
(45) Date of Patent: Aug. 27, 2002

(54) MULTIDIRECTIONAL INPUT DEVICE

(75) Inventors: Kisaburo Takahashi; Jun Yashiro, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/800,617

(22) Filed: Mar. 7, 2001

(30) Foreign Application Priority Data

Mar. 10, 2000 (JP) ......................................... 2000-072474

(51) Int. Cl.⁷ ............................................... H01H 19/20
(52) U.S. Cl. ............................................. 200/4; 200/18
(58) Field of Search ........................... 200/4, 5 R, 6 A, 200/175, 175.6 B, 179, 17 R, 564, 567, 570, 329, 330, 336, 18, 11 TW, 7

(56) References Cited

U.S. PATENT DOCUMENTS

| | | | | |
|---|---|---|---|---|
| 4,945,195 A | * | 7/1990 | Ipcinski | 200/6 B |
| 5,594,220 A | * | 1/1997 | Hackbarth et al. | 200/6 B |
| 5,606,155 A | * | 2/1997 | Garcia | 200/11 R |
| 5,613,600 A | | 3/1997 | Yokoji et al. | |
| 5,669,489 A | * | 9/1997 | Von Ende | 200/570 |
| 5,952,628 A | * | 9/1999 | Sato et al. | 200/4 |
| 6,049,044 A | * | 4/2000 | Mizobuchi | 200/4 |
| 6,100,480 A | | 8/2000 | Takahashi | |
| 6,124,555 A | * | 9/2000 | Ishikawa | 200/4 |
| 6,162,999 A | * | 12/2000 | Ishikawa et al. | 200/6 A |
| 6,184,480 B1 | * | 2/2001 | Nishimoto et al. | 200/4 |
| 6,194,673 B1 | * | 2/2001 | Sato et al. | 200/4 |
| 6,198,057 B1 | * | 3/2001 | Sato et al. | 200/28 |
| 6,291,782 B1 | * | 9/2001 | Isikawa | 200/14 |
| 6,333,473 B1 | * | 12/2001 | Sawada et al. | 200/4 |

* cited by examiner

Primary Examiner—Renee Luebke
Assistant Examiner—Lisa N Klaus
(74) Attorney, Agent, or Firm—Brinks Hofer Gilson & Lione

(57) ABSTRACT

A multidirectional input device is disclosed wherein one rotary electric part and two first and second push-switches are operated by one operating member. In comparison with the prior art, a larger number of electric parts can be operated and thus the multidirectional input device is suitable for use in a portable electronic device for which various functions are required.

5 Claims, 10 Drawing Sheets

MULTIDIRECTIONAL INPUT DEVICE

BACKGROUND OF THE INVENTION

1. Field of the Invention

The present invention relates to a multidirectional input device for use, for example, in a computer terminal device such as a mouse or a portable electronic device such as a portable telephone set.

2. Description of the Prior Art

The configuration of a conventional multidirectional input device will now be described with reference to FIG. 18. A rotary electric part 50 is constituted by a rotary encoder, and an insulating base 51 formed by molding a synthetic resin and constituting the rotary electric part 50 is provided with a substrate portion 51b having a central circular hole 51a, with plural contact pieces 52 being embedded in the substrate portion 51b.

A cover 53 of the rotary electric part 50 is provided with a cylindrical portion 53b having a circular hole 53a. The cover 53 is attached to the insulating base 51 so as to cover an opening portion of the insulating base.

A rotor 54 of the rotary electric part 50, which rotor is formed by molding a synthetic resin, is provided with a disc portion 54a, shaft portions 54b and 54c projecting from both sides of the disc portion 54a, and a hexagonal, non-circular through hole 54d formed in a central part of the rotor 54. Code patterns 55 are formed on a surface of the disc portion 54a.

In the rotor 54 constructed as above, the shaft portion 54b is fitted in the hole 51a of the insulating base 51 and the shaft portion 54c is fitted in the hole 53a of the cylindrical portion 53b. Further, the rotor 54 is sandwiched axially and rotatably between the insulating base 51 and the cover 53.

By both insulating base 51 and cover 53 the rotor 54 is held so as not to tilt in the axial direction.

When the rotor 54 is mounted, the code patterns 55 formed on the rotor come into contact with the contact pieces 52, and upon rotation of the rotor 54, the code patterns 55 also rotate in sliding contact with the contact pieces 52 and produce pulse signals. The rotary electric part 50 thus constructed is mounted to a printed circuit board P2.

The conventional multidirectional input device has a push-switch 56. The push-switch 56 is provided with a housing 56a formed by molding a synthetic resin and with a contact portion (not shown) housed therein and is also provided with a push-button 56b attached to the housing 56a movably. The push-switch 56 is mounted to the printed circuit board P2 in a predetermined spaced position from the rotary electric part 50.

An operating member 57 is provided with an operating portion 57a of a large diameter, shafts 57b and 57c projecting from both sides of the operating portion 57a, and a regular hexagonal sphere portion 57d formed at one end of the shaft 57b.

The operating member 57 is mounted by inserting the regular hexagonal sphere portion 57d on the shaft 57b side into the through hole 54d of the rotor 54 from the insulating base 51 side and by holding the shaft 57c with the housing 56a. A coiled spring 58 is disposed between the shaft 57c and the housing 56a so that the operating member 57 is positioned on a horizontal line Z2.

According to this arrangement, the operating member 57 can perform both a rotating motion and a tilting motion with the abutment portion of the regular hexagonal sphere portion 57d against the rotor 54 as fulcrum.

In the conventional multidirectional input device having such a configuration, when the operating portion 57a of the operating member 57 is rotated, the rotor 54 is rotated by the regular hexagonal sphere portion 57d of the shaft 57b and the code patterns 55 rotate in sliding contact with the contact pieces 52, producing pulse signals.

If the operating member 57 is pushed in a direction perpendicular to the axial direction (i.e., horizontal line Z2), the shaft 57c moves against the coiled spring 58 with the abutment portion of the regular hexagonal sphere portion 57d against the rotor 54 as fulcrum, the operating member 57 tilts to the position indicated with an inclined line Y2, and the push-button 56b is pushed by the shaft 57c to operate the push-switch 56.

Upon release of the operating member 57, the operating member returns to its original position on the horizontal line Z2 under the action of the coiled spring 58 and the push-switch 56 also reverts to its original state.

In the case where the conventional multidirectional input device, which is operated in such a manner, is used in a portable electronic device for example, a vertical or transverse scrolling operation is performed by the rotary electric part 51, and an operation for decision may be performed by the push-switch 56.

When the operating member 57 tilts in the conventional multidirectional input device, the regular hexagonal sphere portion 57d performs a circular motion with respect to the rotor 54, and for allowing the circular motion to be carried out smoothly, the regular hexagonal sphere portion 57d is fitted in the through hole 54d loosely. Consequently, between the regular hexagonal sphere portion 57d and the rotor 54 there occurs a play in the rotational direction upon rotation of the operating member 57, so that the rotation of the operating member 57 cannot immediately be transmitted to the rotor 54.

Further, as the tilting motion of the operating member 57 is repeated, there occurs wear between the regular hexagonal sphere portion 57d and the rotor 54, so that the play in the rotational direction becomes larger, making it more and more distant from the possibility of immediate transfer of the rotation of the operating member 57 to the rotor 54.

In the conventional multidirectional input device, one rotary electric part 51 and one push-switch 56 are operated by the operating member 57 and thus the number of electric parts operated by one operating member 57 is small. This is not suitable for a portable electronic device for which various functions are required.

SUMMARY OF THE INVENTION

Accordingly, it is an object of the present invention to provide a small-sized, multidirectional input device wherein many electric parts can be operated by a single operating member and which is suitable for use in a portable electronic device.

According to the first solving means adopted by the invention for solving the above-mentioned problems there is provided a multidirectional input device comprising a rotary electric part having a rotor and an operating member having a shaft and an operating portion, the shaft being splined to a non-circular hole formed in the rotor, the operating portion being formed on an outer peripheral portion in an axial direction of the shaft and thicker than the shaft, wherein two first and second push-switches are disposed side by side in parallel with the axial direction of the shaft, an actuating member capable of performing a rotating motion and a sliding motion in the axial direction and capable of coming into abutment against the operating member is provided, the actuating member extending in a direction orthogonal to the axial direction, the rotary electric part is operated by rotation of the operating member, and the two first and second push-switches are operated through the actuating member by the sliding motion in the axial direction of the operating member.

According to the second solving means adopted by the invention there is provided, in combination with the above first means, a multidirectional input device wherein the actuating member has a pair of branched arm portions, the arm portions being put in abutment against both side faces of the operating portion positioned lower than the operating side.

According to the third solving means adopted by the invention there is provided, in combination with the above first means, a multidirectional input device wherein the two first and second push-switches are disposed in positions spaced from and opposed to each other, and the actuating member is disposed between the two first and second push-switches.

According to the fourth solving means adopted by the invention there is provided, in combination with the above first means, a multidirectional input device wherein one end portion of the actuating member is supported and an opposite end portion thereof rotates arcuately with the one end portion as fulcrum.

According to the fifth solving means adopted by the invention there is provided, in combination with the above first means, a multidirectional input device wherein one end portion of the shaft of the operating member is splined to the rotor, a third push-switch is disposed so as to be opposed to an opposite end portion of the shaft, the operating member tilts when pushed in a direction perpendicular to the axial direction, and the third push-switch is operated by the shaft of the operating member in response to the tilting motion of the operating member.

DETAILED DESCRIPTION OF THE PREFERRED EMBODIMENT

Figure 1:
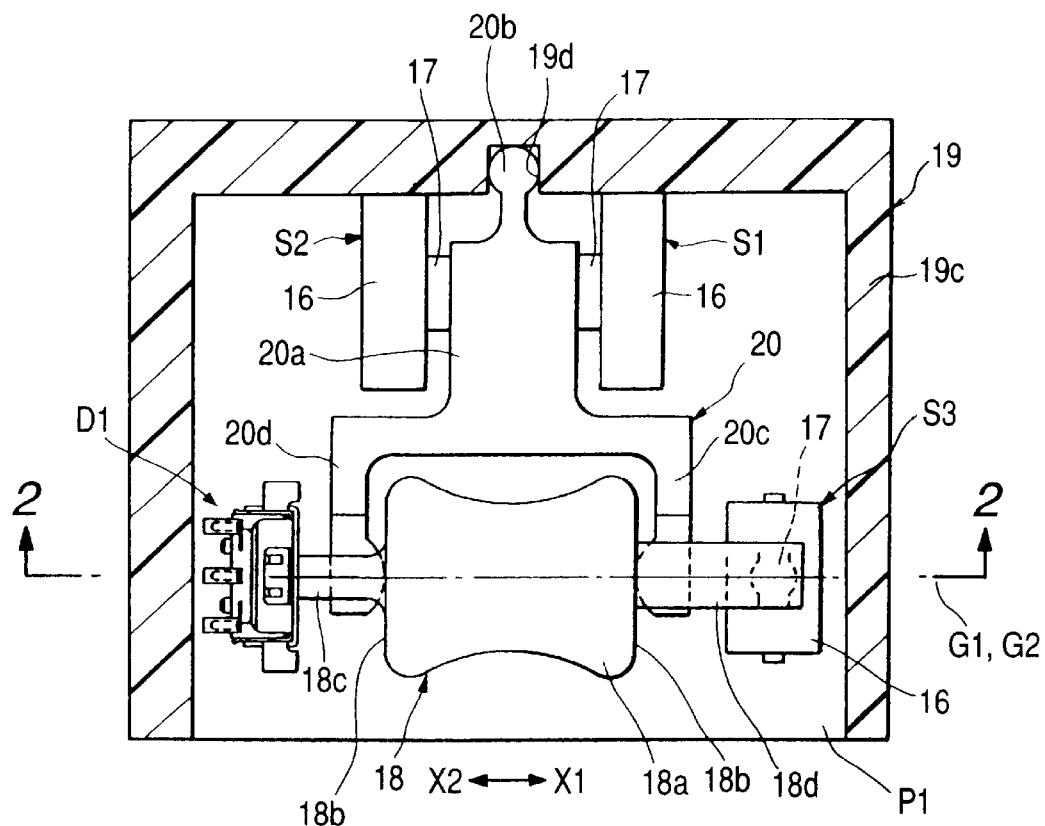
FIG. 1 is a partially sectional plan view of a multidirectional input device according to the present invention.

Reference will first be made to the configuration of a rotary electric part D1 used in a multidirectional input device embodying the present invention. In this embodiment, the rotary electric part D1 is formed as a rotary encoder. The configuration thereof will now be described with reference to FIGS. 6 to 17. An insulating base 1, which is formed by molding an insulating material, is made up of a rectangular main base portion 2, a side wall portion 3 which is upright at right angles from the main base portion 2, and a pair of sub-base portions 5 connected respectively both sides of the main base portion 2 through thin-walled portions 4.

The main base portion 2 is provided with recesses 2a formed respectively in end faces on both sides, a cylindrical protrusion 2b formed centrally on a front end face, and a pair of retaining portions 2c formed on a lower surface of the main base portion and each having a tapered portion.

The side wall portion 3 is formed upright from corners of an upper surface of the main base portion 2. The side wall portion 3 is provided with a central circular hole 3b having a flange 3a, a pair of relief holes 3c extending from both sides of the hole 3b up to the main base portion 2, a pair of upper walls 3d extending perpendicularly from an upper position, a groove 3e formed between the paired upper walls 3d, retaining portions 3f formed respectively on upper surfaces of the paired upper walls 3d, and protrusions 3g.

Each of the paired sub-base portions 5 is provided with a convex portion 5a formed on an end face and having a roundish end.

Figure 10:
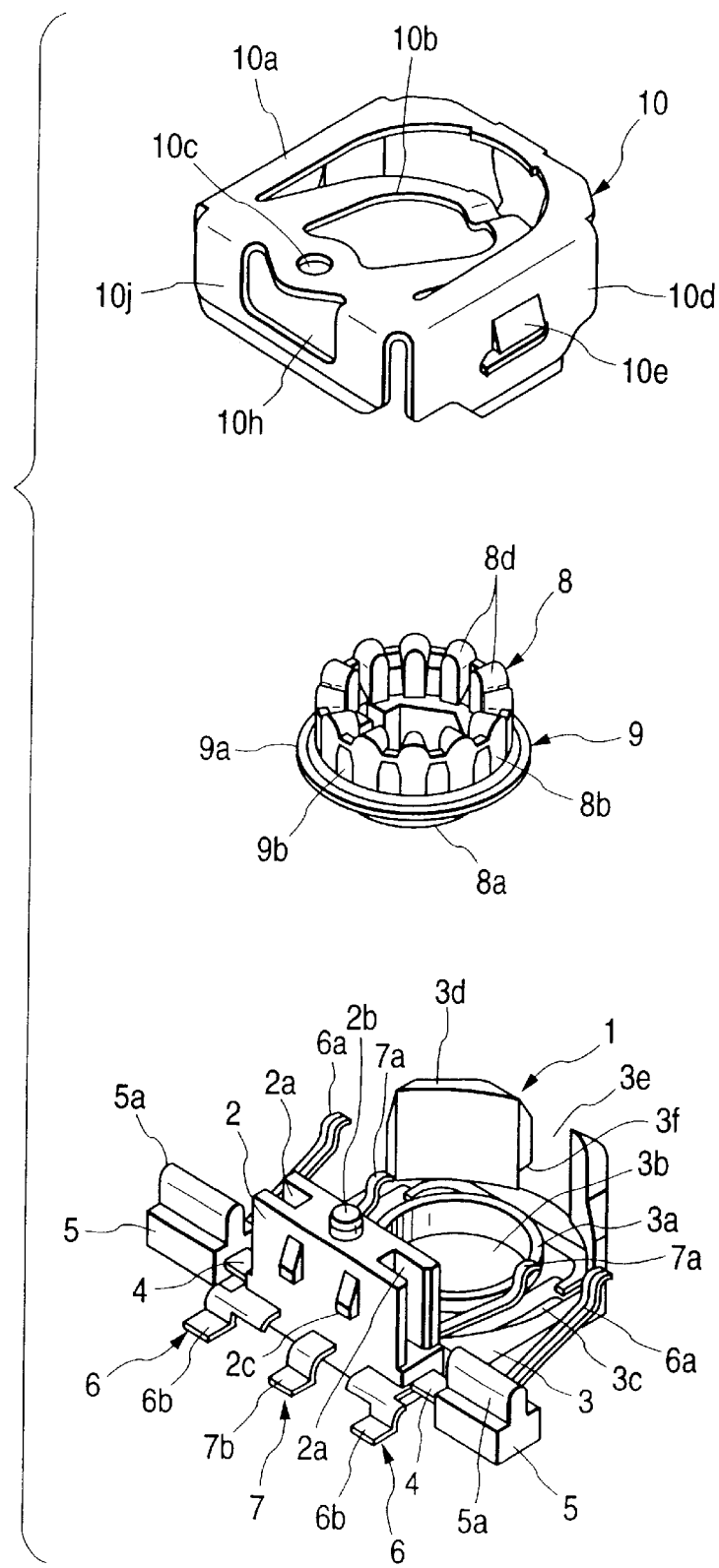
FIG. 10 is an exploded perspective view of the encoder body portion.
Figure 12:
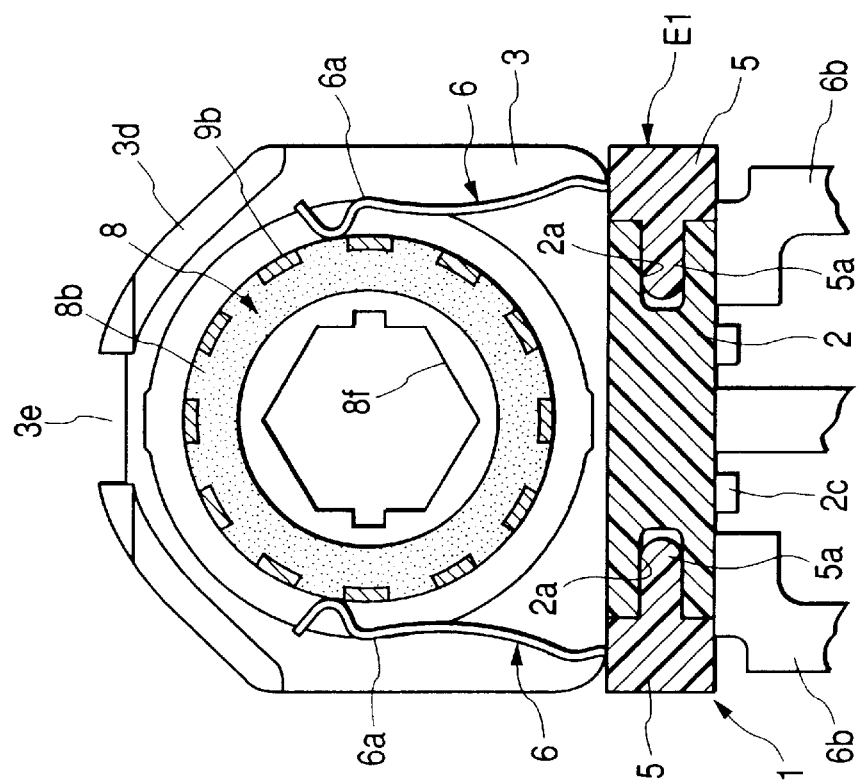
FIG. 12 is a sectional front view of a principal portion of the encoder body portion.
Figure 13:
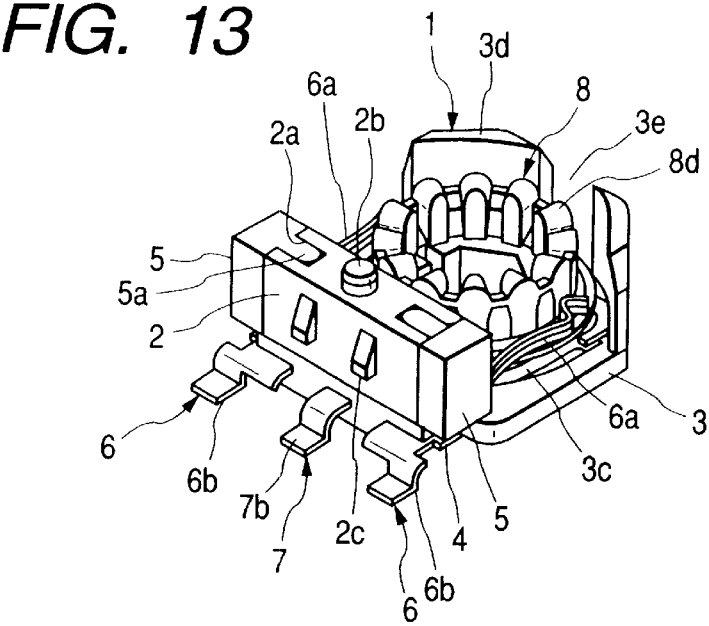
FIG. 13 is a perspective view showing a combination of an insulating base and a rotor in the encoder body portion.

By bending the thin-walled portions 4 in the state shown in FIG. 10 and by press-fitting the protrusions 5a of the sub-base portions 5 into the recesses 2a of the main base portion 2 there is formed a rectangular insulating base 1, as shown in FIG. 13.

A plurality of contact pieces 6 each formed by a metallic plate are each provided with a contact portion 6a and a terminal portion 6b. The contact pieces 6 are respectively embedded in the sub-base portions 5. The contact portion 6a projects upward from an upper surface of the insulating base 1, while the terminal portion 6b projects downward from a lower surface of the insulating base 1 and a flat surface of an outer end thereof is bent so as to be positioned in parallel with and at substantially the same position as one end of the insulating base 1, i.e., the side wall portion 3.

A common contact piece 7, which is formed of a metal, is provided with a pair of contact portions 7a and a terminal portion 7b. The common contact piece 7 is embedded in the main base portion 2 at a position close to the side wall portion 3. The contact portions 7a project upward from the upper surface of the insulating base 1 and are positioned in the relief holes 3c of the side wall portion 3, while the terminal portion 7b projects downward from the lower surface of the insulating base 1.

In this embodiment, part of each embedded contact piece 6 straddles the main base portion 2 and the associated sub-base portion 5 and constitutes each thin-walled portion 4 as a connection between the main and sub-base portions 2, 5.

A metallic plate separate from that of the contact piece 6 may be embedded in the insulating base 1 to form each thin-walled portion 4. Further, the thin-walled portion 4 may be formed by the insulating material of the insulating base 1.

A cylindrical rotor 8, which is formed by molding an insulating material, comprises a shaft portion 8a provided on one end side, a holding portion 8b formed contiguously to the shaft portion 8a and having a diameter larger than the diameter of the shaft portion 8a, a concave-convex portion 8d for clicking which is formed on an end face 8c on one side of the holding portion 8b which end face is orthogonal to a rotational axis direction of the rotor, and end face 8e positioned between the shaft portion 8a and the holding portion 8b on an opposite side of the holding portion, the end face 8e being orthogonal to the rotational axis direction of the rotor, and a non-circular, hexagonal hole 8f formed centrally.

Figure 14:
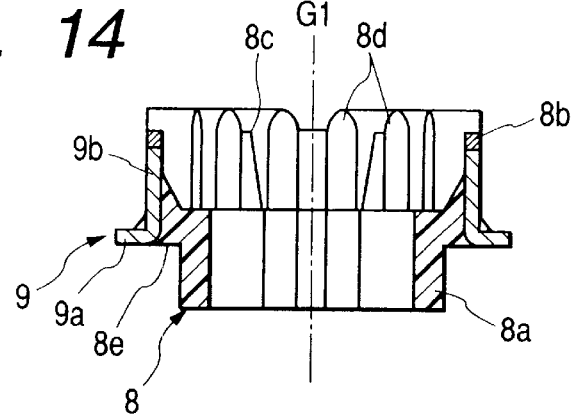
FIG. 14 is a sectional view of the rotor in the encoder body portion.

A code member 9, which is formed by a metallic plate, is provided with a ring-like plate portion 9a which forms a common pattern and a plurality of tongue pieces 9b which are bent from an inner periphery of the plate portion 9a and which form code patterns, as shown particularly in FIG. 14.

The code member 9 is embedded or press-fitted into the rotor 8. The ring-like plate portion 9a which forms a common pattern is positioned at the end face 8e of the rotor 8, while the tongue pieces 9b which form a code pattern are exposed to an outer circumferential surface of the holding portion 8b. The tongue pieces 9b extend in an axial direction G1 (see FIG. 8) of the rotor 8.

The shaft portion of the rotor 8 is inserted into the hole 3b of the side wall portion 3, whereby the rotor 8 and the code member 9 both constituted as above are held rotatably.

Figure 17:
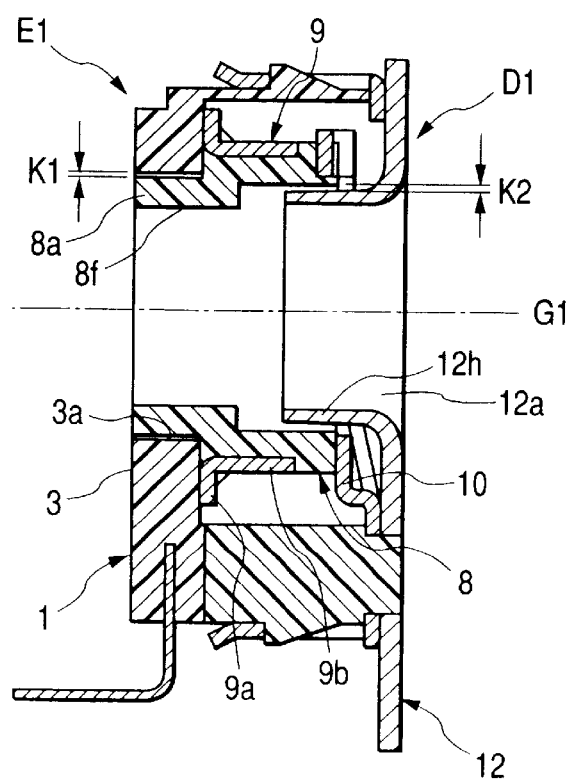
FIG. 17 is a sectional view of the rotary electric part.
Figure 18:
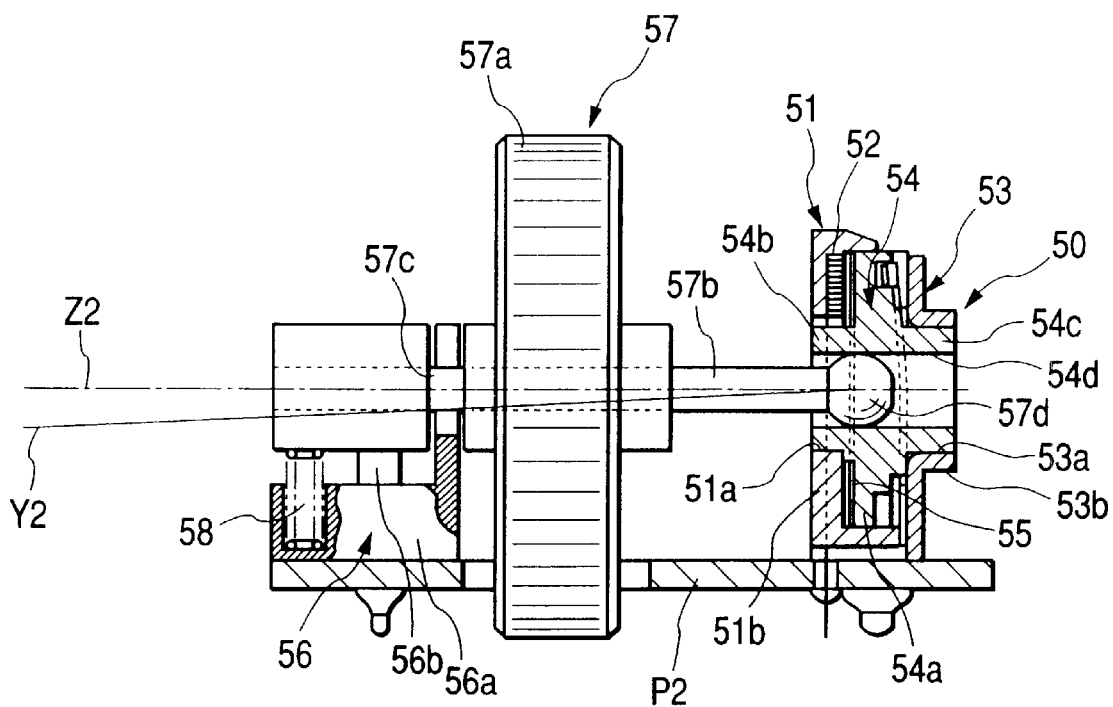
FIG. 18 is a partially sectional front view of a conventional multidirectional input device.

In this case, as shown in FIG. 17, the shaft portion 8a is fitted in the hole 3b loosely so as to create a small clearance K1, thereby permitting the rotor 8 to perform a tilting motion with respect to the insulating base 1.

When the rotor 8 is mounted to the insulating base 1, the paired contact portions 7a of the common contact piece 7 are opposed to the end face 8e and are in contact with the plate portion 9a as a common pattern of the code member 9.

With the rotor 8 mounted to the insulating base 1, the plural contact pieces 6 are positioned on opposite sides with the circumferential surface of the rotor therebetween and come into and out of contact with the tongue pieces 9b as code patterns of the code member 9, and a pair of contact portions 6a are brought into contact with the code patterns with a phase difference.

Figure 11:
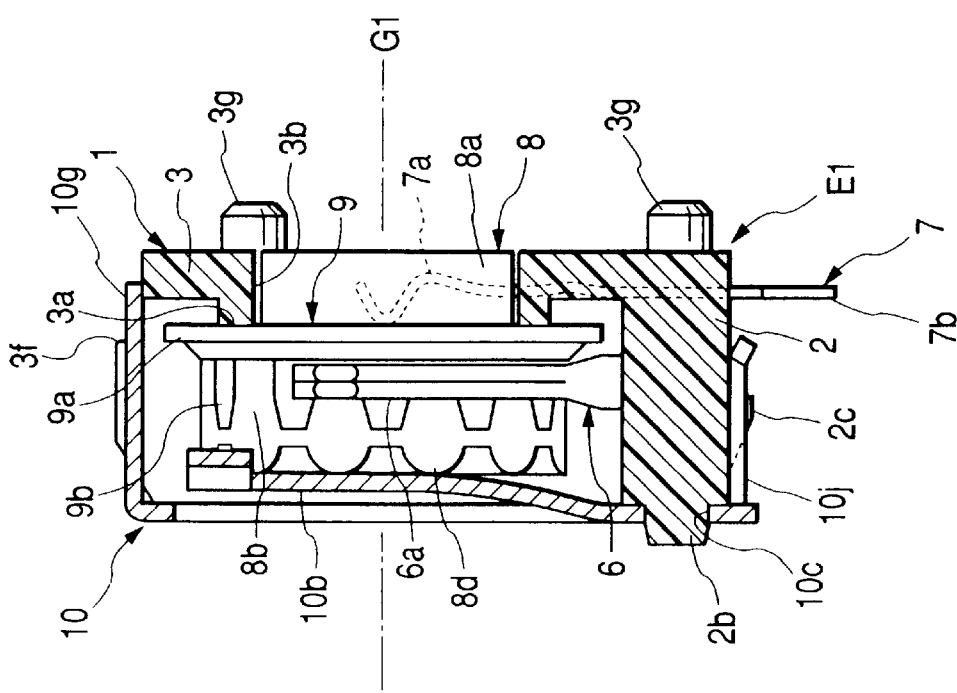
FIG. 11 is a sectional side view of a principal portion of the encoder body portion.

At this time, as shown in FIG. 11. the contact pieces 6 are located perpendicularly to the axial direction G1 and are put in sliding contact with the code patterns.

An engaging member 10, which is formed by a metallic plate, comprises a rectangular plate-like base portion 10a, an engaging portion 10b formed by cutting and bending a central part of the base portion 10 in a C shape, the engaging portion 10b having convex portions at free ends thereof, a circular hole 10c formed in a lower position of the base portion 10a, a pair of side plates 10d bent from both sides of the base portion 10a, cut and raised portions 10e formed in the side plates 10d respectively, a T-shaped upper-side plate 10g bent from an upper side of the base portion 10a and having a retaining portion 10f at a free end thereof, and a C-shaped lower-side plate 10j bent from a lower side of the base portion 10a and having a rectangular hole 10h formed centrally.

The engaging member 10 is aligned with the insulating base 1 so that the engaging portion 10b becomes opposed to the end face 8c of the rotor 8 having the concave-convex portion 8d, and then the protrusion 2b is inserted into the hole 10c.

Thereafter, the upper-side plate 10g is positioned on the upper walls 3d of the side wall portion 3 and is pushed in, allowing the retaining portion 10f to be engaged with the retaining portions 3f. Further, the upper-side plate 10g is positioned in the groove 3e and is secured to the side wall portion 3.

Simultaneously with the mounting of the upper-side plate 10g the lower-side plate 10j is positioned on the lower surface of the main base portion 2 and is pushed in, allowing the retaining portions 2c to be positioned in the hole 10h, whereby the lower-side plate 10j is locked to the retaining portions 2c and the lower-side plate 10j is secured to the main base portion 2.

In this way the engaging member 10 is mounted at both upper and lower positions relative to the rotor 8, while the side plates 10d are located at right and left positions respectively relative to the rotor 8.

When the engaging member 10 is mounted, the convex portions of the engaging portion 10b are engaged disengageably with the concave-convex portion 8d formed on the end face 8c of the rotor 8, constituting a click mechanism.

Further, the engaging member 10, the contact pieces 6 and the common contact piece 7 extend toward the rotor 8 with the insulating base 1 as a reference plane.

An encoder body El is formed by such a configuration.

Figure 15:
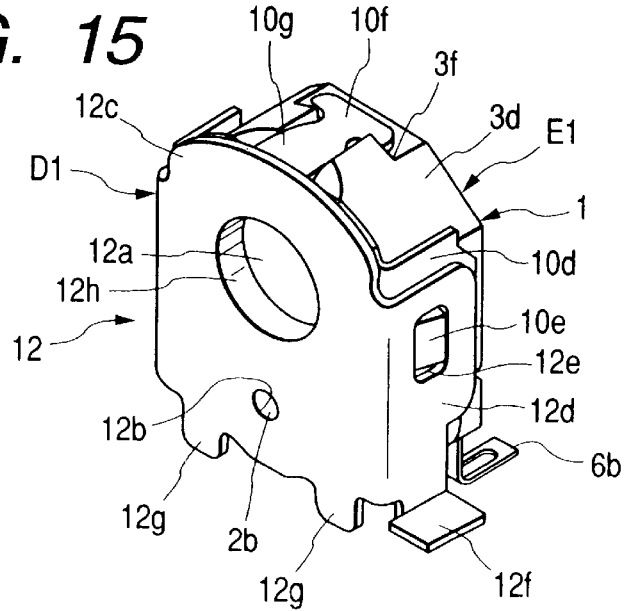
FIG. 15 is a perspective view of a rotary electric part used in the multidirectional input device.
Figure 16:
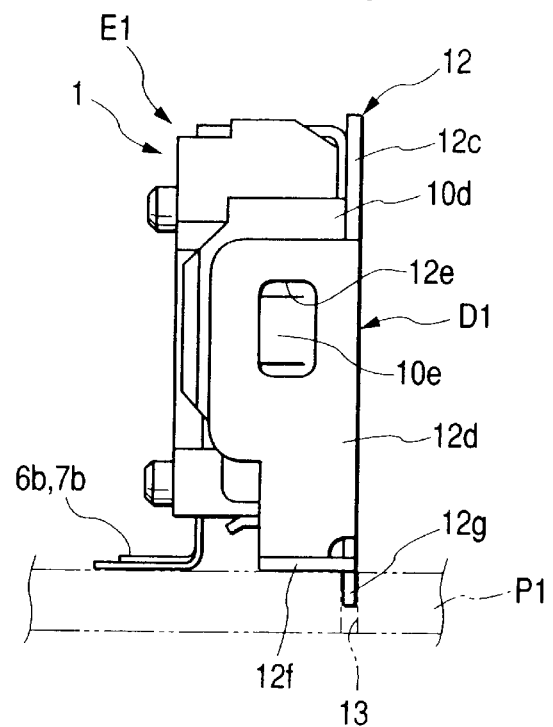
FIG. 16 is a side view of the rotary electric part.

As shown in FIGS. 15 to 17, a mounting plate 12, which is constituted by a solderable metallic plate, comprises a flat plate portion 12c, the flat plate portion 12c having a cylindrical portion 12h formed with a large circular hole 12a provided at a center and also having a small hole 12b in a lower position, a pair of arm portions 12d bent opposedly from both sides of the flat plate portion 12c, rectangular holes 12e formed at the center of the arm portions 12d respectively, mounting portions 12f bent from side ends of the arm portions 12d, and projecting portions 12g provided on the mounting portions 12f side of the flat plate portion 12c.

As shown in FIGS. 15 to 17, the mounting plate 12 is positioned on the engaging member 10 side of the encoder body E1 and the cylindrical portion 12h is positioned within the rotor 8, then in this state the protrusion 2b of the insulating base 1 is inserted into the small hole 12b.

Thereafter, the arm portions 12d are pushed inwards on the side plates 10d of the engaging member 10, so that the cut and raised portions 10e are positioned in the holes 12e respectively and the arm portions 12d are engaged with the cut and raised portions 10e, whereby the mounting plate 12 is snap-fastened to the engaging member 10.

When the mounting plate 12 is thus mounted, the flat plate portion 12c is superimposed outside the plate-like base portion 10a of the engaging member 10, the arm portions 12d are mounted to the side plate 10d respectively at right and left positions with respect to the rotor 8. Lower surfaces of the mounting portions 12f bent from side ends of the arm portions 12d which extend in the axial direction G1 of the rotor 8 are located at approximately the same position as the L-shaped terminal portions 6b and 7b of the contact pieces 6 and the common contact piece 7 both extending from the lower surface of the insulating base 1.

When the mounting plate 12 is mounted, as shown in FIG. 17, a clearance K2 is formed between the cylindrical portion 12h and the rotor 8, the clearance K2 being larger than the clearance K1.

The rotor 8 is brought into abutment against the side wall portion 3 by the engaging member 10.

In this way there is formed a rotary encoder as the rotary electric part D1. It goes without saying that the rotary encoder may be substituted by another rotary electric part.

In the rotary electric part D1 with the mounting plate 12 attached thereto, as shown in FIG. 16, the undersides of the main- and sub-base portions 2, 5 are brought into opposition to a printed circuit board P1 and the projecting portions 12g are inserted into holes 13 formed in the printed circuit board P1, whereby the rotary electric part D1 is established its position. At the same time, the terminal portions 6b and 7b of the contact pieces 6 and the common contact piece 7, and the mounting portions 12f of the mounting plate 12, are positioned on wiring patterns (not shown) formed on an upper surface of the printed circuit board P1.

The contact pieces 6, the common contact piece 7 and the mounting plate 12 thus constituted are surface-mounted to the wiring patterns by creamy solder and thus mounted to the printed circuit board P1, whereby the rotary electric part D1 is mounted to the printed circuit board in parallel with the axial direction G1 of the rotor 8.

A description will now be given about the operation of the rotary encoder as the rotary electric part D1 constructed as above. First, an operating member 18 to be described later is fitted and engaged into the hole 8f of the rotor 8 through the hole 12a of the mounting plate 12 and is then rotated, so that the rotor 8 and the code member 9 rotate with the shaft portion 8a as a support portion.

The concave-convex portion 8d of the rotor 8 performs engaging and disengaging motions for the engaging portion 10b to effect a click motion, the tongue pieces 9b come into and out of contact with the contact pieces 6, and the common contact piece 7 contacts the plate portion 9a constantly, with consequent generation of a two-phase pulse signal between the contact pieces 6 and the common contact piece 7.

In the multidirectional input device of this embodiment, the rotary electric part D1 constituted as above is mounted to the printed circuit board P1, as shown in FIGS. 1 to 5.

First, second and third push-switches S1, S2, S3, as shown in FIGS. 1 to 5, are each made up of a housing 16 which houses a contact portion (not shown) therein and a push-button 17 which is secured to the housing 16 vertically movably and which is urged upwards constantly.

The push-switches S1 and S2 are mounted on the printed circuit board P1 so as to be orthogonal to the axial direction G1 in the surface direction of the printed circuit board PI and opposed to each other side by side in parallel with the axial direction G1. The push-switch S3 is mounted to the printed circuit board P1 on an extension of the axial direction G1 spacedly a predetermined distance from the rotary electric part D1.

The operating member 18, which is formed by molding a synthetic resin, comprises a hourglass-like operating portion 18a of a large diameter, cylindrical shafts 18c and 18d smaller in diameter than the operating portion 18a, the shafts 18c and 18d projecting in an axial direction G2 of the operating member 18 from central positions of both side faces 18b of the operating portion 18a, and a hexagonal, non-cylindrical, non-circular portion 18e formed at an end portion of the shaft 18c.

The shaft 18c of the operating member 18 is inserted into the hole 12a from the mounting plate 12 side while being guided by the cylindrical portion 12h, and the non-circular portion 18e is fitted in the non-circular hole 8f of the rotor 8.

At this time, the non-circular portion 18e and the hole 8f are fitted together tightly, leaving no play between the two in the rotational direction.

When the shaft 18c is inserted into the hole 8f, the other shaft 18d is abutted against the top of the push-button 17 of the third push-switch S3.

Figure 2:
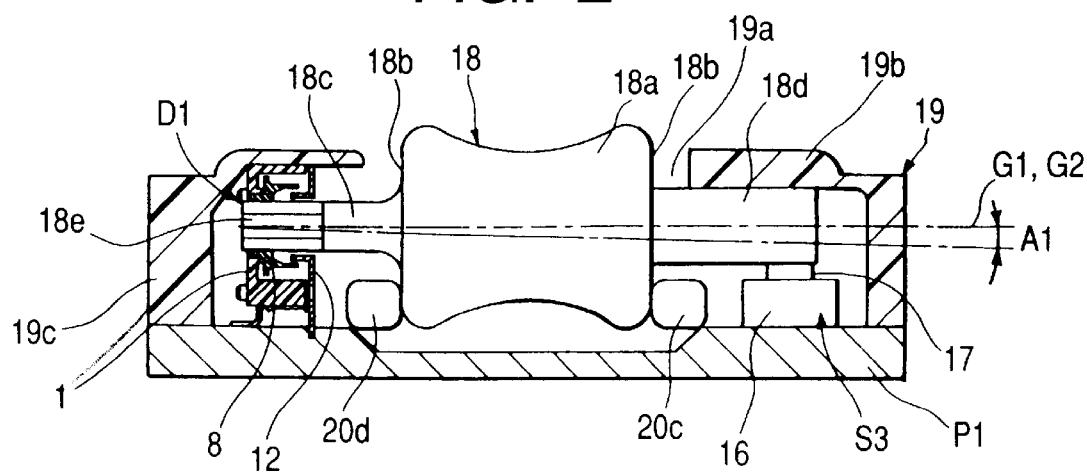
FIG. 2 is a sectional view of a principal portion taken on line 2—2 in FIG. 1.
Figure 3:
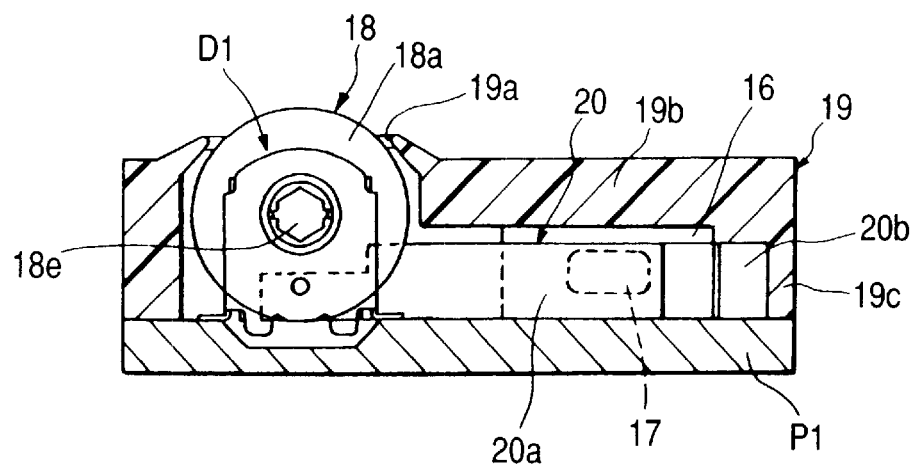
FIG. 3 is a partially sectional front view of the multidirectional input device.

In this state, the axial directions G1 and G2 of the rotor 8 and the operating member 18, respectively, are aligned with each other, as shown in FIGS. 1 and 2.

As shown in FIGS. 1 to 5, a case 19, which is formed by molding a synthetic resin, comprises an upper wall 19b having a hole 19a, side walls 19c extending downwards from the outer periphery of the upper wall 19b, and a concave holding portion 19d formed in a side wall 19c.

The case 19 is mounted to the printed circuit board P1 while covering the rotary electric part D1 and also covering the first, second and third push-switches S1, S2, S3. When the case 19 is thus mounted, part of the operating portion 18a projects outwards from the hole 19a.

The operating member 18 can perform a rotating motion, a sliding motion in the axial direction G2, and a tilting motion when pushed in a direction orthogonal to the axial direction G2.

An actuating member 20, which is formed by molding a synthetic resin, comprises a base portion 20a, an arcuate support portion 20b provided at one end of the base portion 20a, and a pair of arm portions 20c and 20d bifurcated from the opposite end of the base portion 20a.

The actuating member 20 is disposed on the printed circuit board P1 so that its support portion 20b is held by the holding portion 19d of the case 19 and so that the paired arm portions 20c and 20d hold the operating portion 18a therebetween. The arm portions 20c and 20d can abut both side faces 18b respectively of the operating portion 18a.

Further, the paired arm portions 20c and 20d can abut the side faces 18b at positions lower than the operating side (the portion projecting from the hole 19a) of the operating member 18a. With the support portion 20b of the actuating member 20 as fulcrum, the arm portions 20c and 20d at the opposite end of the actuating member are adapted to rotate arcuately.

The following description is now provided about the operation of the multidirectional input device of this embodiment which is constituted as described above.

First, the operating portion 18a projecting from the hole 19a is rotated with a finger, with consequent rotation of the shafts 18c and 18d and subsequent rotation of the code member 9 together with the rotor 8 through the non-circular portion 18e, so that the contact pieces 6 come into sliding contact with the tongue pieces 9b as code patterns, producing a pulse signal.

There is made pre-setting so that the pulse signal is OFF when the engaging member 10 is engaged with a concave section in the concave-convex portion 8d.

Figure 4:
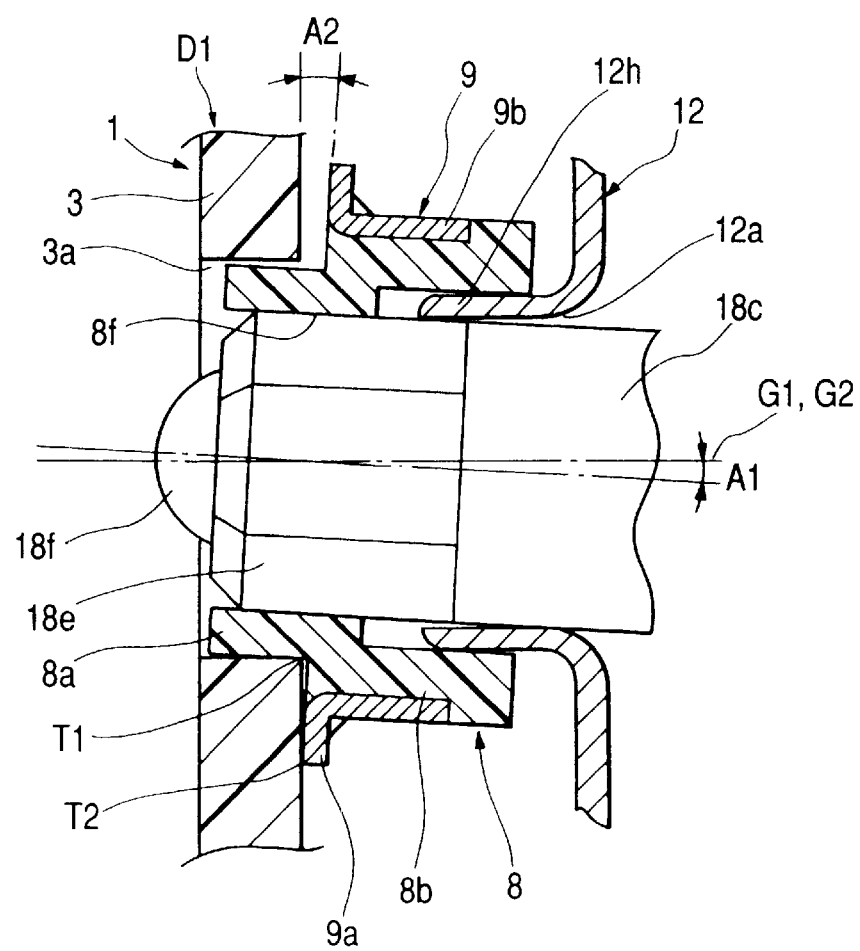
FIG. 4 is an enlarged sectional view of a principal portion, showing the operation of the mutidirectional input device.

Next, if the operating portion 18a of the operating member 18 is pushed in a direction orthogonal to the axial direction G2, the operating member 18 tilts at a predetermined angle A1 on its shaft 18d side with the rotary electric part D1 as fulcrum, as shown in FIGS. 2 and 4, with the result that the push-button 17 of the third push-switch S3 moves downward and the third push-switch S3 is operated (contact ON to OFF or OFF to ON).

More specifically, the tilting motion of the operating member 18 is performed in the following manner. As shown in FIG. 4, when the operating member 18 is pushed, first a lower portion of the shaft 8a of the rotor 8 comes into abutment with the side face of the insulating base 1 which defines the hole 3b. As the operating member 18 is further pushed, the rotor 8 begins to tilt with an abutment portion T1 as fulcrum and at the same time the outermost periphery of the plate portion 9a of the code member 9 abuts the insulating base 1 at an abutment portion T2. With both abutment portions T2 and T1 of the code member 9 and the shaft 8a, respectively, as fulcrums, the rotor 8 tilts, and with this tilting motion of the rotor, the operating member 18 also tilts together with the rotor.

As a result, the rotor 8 tilts at a predetermined angle A2 equal to that of the operating member 18, as shown in FIG. 4, and the mounting plate 12-side portion of the rotor 8 moves to a greater extent than the insulating base 1-side portion thereof, but the presence of the large clearance K2 permits the tilting motion of the rotor 8.

Further, when the rotor 8 tilts, the code patterns (tongue pieces 9b) extending in the axial direction G1 and the contact pieces 6 disposed perpendicularly thereto are in contact with each other, provided the position of contact of the code patterns with the contact pieces 6 merely shifts downward, and therefore both are kept contacted positively.

Besides, since the position of contact of the contact pieces 6 with the tongue pieces 9b is close to the tilt center, the tongue pieces 9b are less displaced at their contact portions with the contact pieces 6, thus making it difficult to produce unnecessary pulse signals.

Next,. when the pressure imposed on the operating member 18 is relieved, the shaft 18d is restored to its original state by the urged push-button 17 in the third push-switch S3, so that the operating member 18 and the rotor 8 are restored to their original horizontal state and the third push-switch S3 also reverts to its original state. Thus, switching of contacts is performed.

During the tilting motion of the operating member 18, the shaft 18d is guided by a vertical groove (not shown) formed in the case 19 and thus its downward movement can be done accurately.

Figure 5:
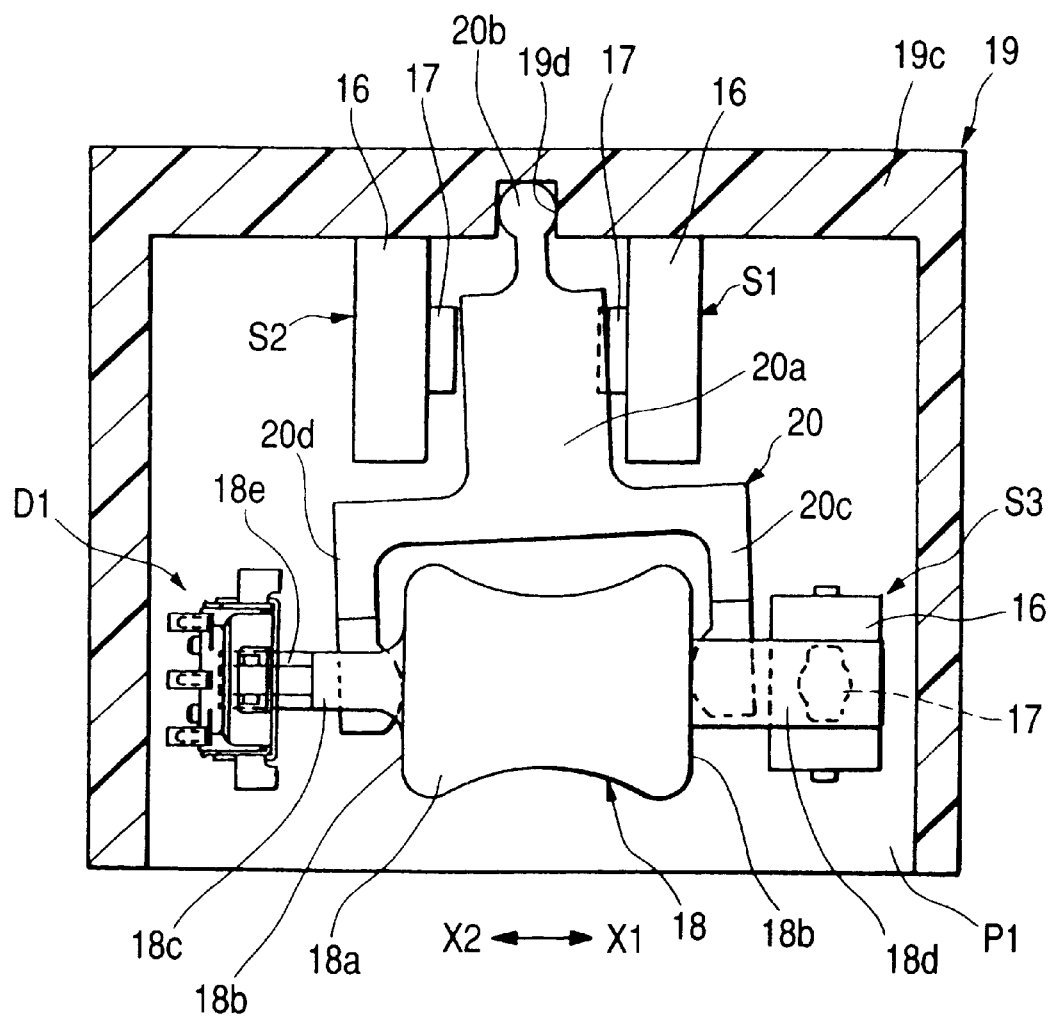
FIG. 5 is a sectional plan view of a principal portion, showing the operation of the multidirectional input device.
Figure 6:
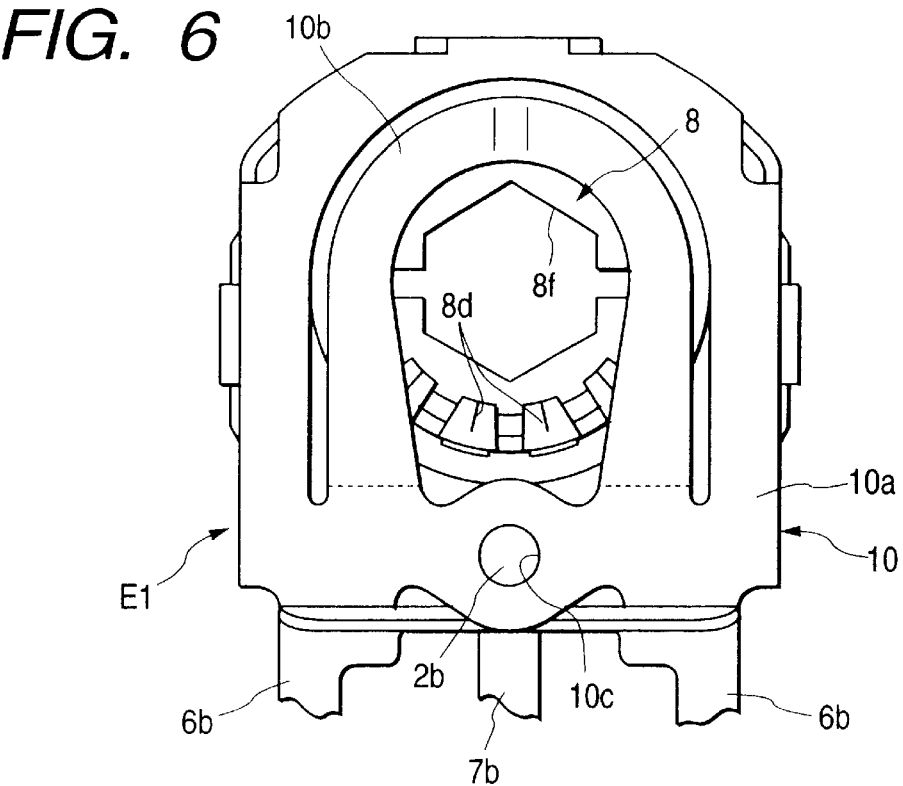
FIG. 6 is a front view of an encoder body portion in the multidirectional input device.
Figure 7:
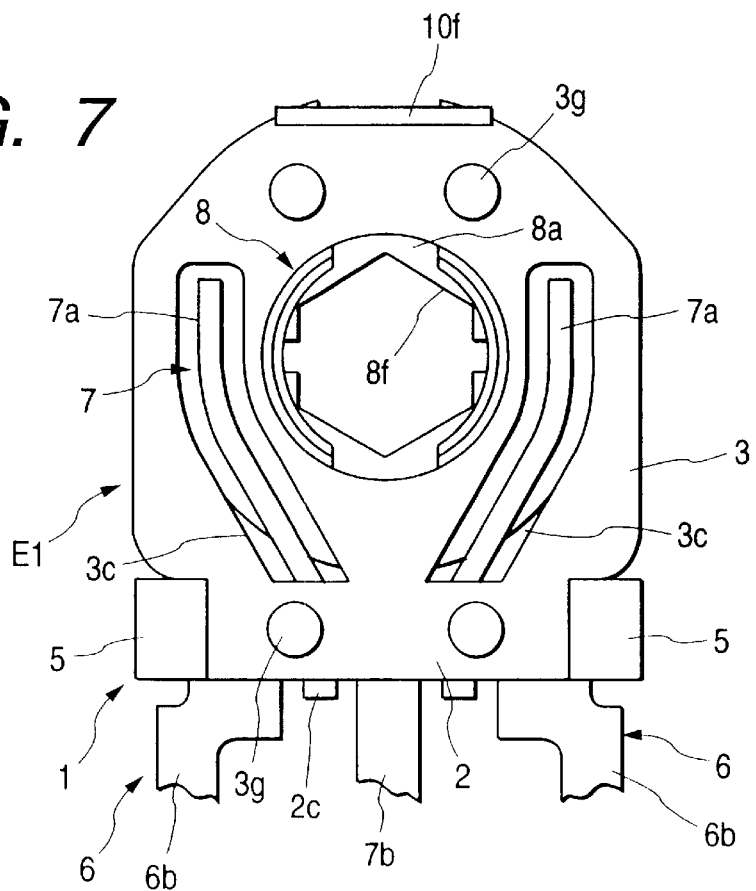
FIG. 7 is a rear view of the encoder body portion.
Figure 8:
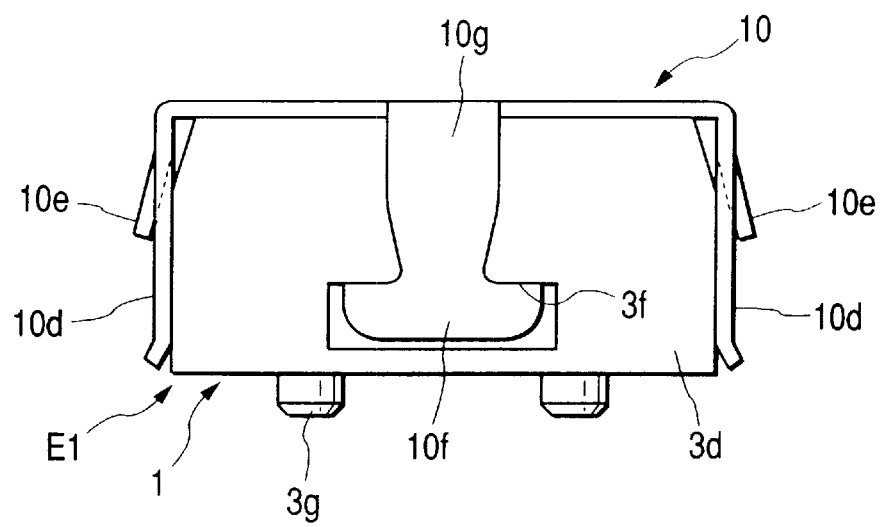
FIG. 8 is a top view of the encoder body portion.
Figure 9:
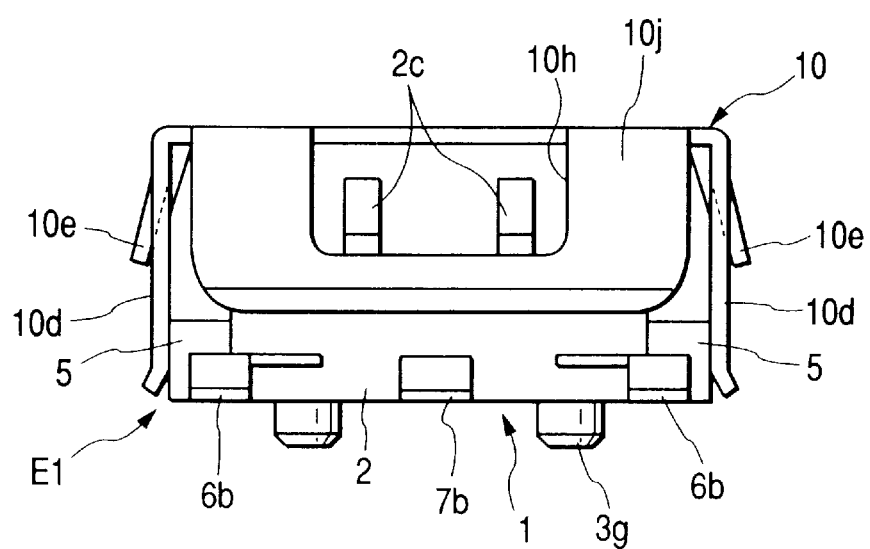
FIG. 9 is a bottom view of the encoder body portion.

When the operating member 18 is operated to slide in the axial direction G2, i.e., in arrow X1 direction, from its neutral state, as shown in FIG. 5, one arm portion 20c is caught by a side face 18b of the operating portion 18a and the actuating member 20 turns counterclockwise with the support portion 20b as fulcrum.

As a result, the first push-switch S1 is operated (contact ON to OFF or OFF to ON) by the base portion 20a.

When the movement of the operating member 18 is stopped, the base portion 20a is pushed back by the urged push-button 17 of the first push-switch S1, so that the operating member 18 is restored to its neutral state by the arm portion 20c and the first push-switch S1 also reverts to its original state.

When the operating member 18 is operated to slide in the axial direction G2, i.e., in arrow X2 direction, from its neutral state, one arm portion 20d is caught by a side face 18b of the operating portion 18a and the actuating member 20 is turned clockwise with the support portion 20b as fulcrum.

As a result, the second push-switch S2 is operated (contact ON to OFF or OFF to ON) by the base portion 20a.

When the movement of the operating member 18 is stopped, the base portion 20a is pushed back by the urged push-button 17 of the second push-switch S2, so that the operating portion 18 is restored to its neutral state by the arm portion 20d and the second push-switch S2 also reverts to its original state.

The multidirectional input device of this embodiment is operated in the manner described above.

In the case where the multidirectional input device of this embodiment is applied to a portable electronic device for example, a vertical scrolling operation is performed by the rotary electric device D1, a transverse scrolling operation is performed by the first and second push-switches S1, S2, and a decision operation is performed by the third push-switch S3.

Although in the above embodiment the tilting motion of the rotor 8 is conducted with the insulating base 1 as a support member, the mounting plate 12 or another member may be used as the support member.

Although in the above embodiment the operating portion 18a and the cylindrical shafts 18c and 18d are formed integrally, the shafts 18c and 18d may be formed by a single non-circular shaft and the operating portion 18a may be splined thereto.

The third push-switch S3 may be omitted.

In the multidirectional input device according to the present invention, since one rotary electric part D1 and two first and second push-switches S1, S2 are operated by one operating member 18, a larger number of electric parts than in the prior art can be operated and thus the multidirectional input device of the invention is suitable for use in a portable electronic device for which various functions are required.

Besides, since two first and second push-switches S1, S2, which are disposed side by side in the axial direction G2, are operated through the actuating member 20 by a sliding motion in the axial direction G2 of the operating member 18, the operation required is simple and the size of the multidirectional input device can be reduced.

Moreover, since the actuating member 20 has a pair of branched arm portions 20c and 20d and these arm portions are abutted against both side faces 18b at lower positions than the operating side with respect to the operating portion 18a, the actuating member 20 is not an obstacle to the operation of the operating portion 18a and thus the multidirectional input device is superior in operability and can be reduced in thickness.

Moreover, the two first and second push-switches S1, S2 are spaced from and opposed to each other and the actuating member 20 is interposed between them, there is attained a good space factor and the multidirectional input device can be further reduced in both thickness and size.

Moreover, since one end portion of the actuating member 20 is supported and with the one end portion as fulcrum the opposite end portion rotates arcuately, the moving range of the actuating member 20 is small, thus permitting the reduction in size of the multidirectional input device.

Further, according to the multidirectional input device of the invention, one end portion of the shaft 18c of the operating member 18 is splined to the rotor 8, the third push-switch S3 is disposed in opposition to the opposite end portion of the shaft 18d, and when the operating member 18 is pushed in a direction perpendicular to the axial direction G2, the operating member 18 performs a tilting motion and the third push-switch S3 is operated by the shaft 18d. Therefore, a larger number of electric parts can be operated and the multidirectional input device is suitable for use in a portable electronic device for which various functions are required.

Further, since the third push-switch S3 is operated through the shaft 18d by a tilting motion of the operating member 18, the operation is simple and the size of the multidirectional input device can be reduced.

What is claimed is:

1. A multidirectional input device comprising:

a rotary electric part having a rotor; and an operating member having a shaft and an operating portion, the shaft being splined to a non-circular hole formed in the rotor, the operating portion being formed on an outer peripheral portion in an axial direction of the shaft and thicker than the shaft, wherein two first and second push-switches are disposed side by side in parallel with the axial direction of the shaft, an actuating member capable of performing a rotating motion and a sliding motion in the axial direction and capable of coming into abutment against the operating member is provided, the actuating member extending in a direction orthogonal to the axial direction, the rotary electric part is operated by rotation of the operating member, and the two first and second push-switches are operated through the actuating member by the sliding motion in the axial direction of the operating member.

2. A multidirectional input device according to claim 1, wherein the actuating member has a pair of branched arm portions, the arm portions being put in abutment against both side faces of the operating portion positioned lower than an operating side.

3. A multidirectional input device according to claim 1, wherein the two first and second push-switches are disposed in positions spaced from and opposed to each other, and the actuating member is disposed between the two first and second push-switches.

4. A multidirectional input device according to claim 1, wherein one end portion of the actuating member is supported and an opposite end portion thereof rotates arcuately with the one end portion as fulcrum.

5. A multidirectional input device according to claim 1, wherein one end portion of the shaft of the operating member is splined to the rotor, a third push-switch is disposed so as to be opposed to an opposite end portion of the shaft, the operating member tilts when pushed in a direction perpendicular to the axial direction, and the third push-switch is operated by the shaft of the operating member in response to the tilting motion of the operating member.

* * * * *

UNITED STATES PATENT AND TRADEMARK OFFICE
CERTIFICATE OF CORRECTION

PATENT NO.    : 6,441,325 B2
DATED         : August 27, 2002
INVENTOR(S)   : Kisaburo Takahashi et al.

It is certified that error appears in the above-identified patent and that said Letters Patent is hereby corrected as shown below:

<u>Title page,</u>
Item [56], U.S. PATENT DOCUMENTS, delete "Ishikawa" and substitute
-- Isikawa -- in its place.

Signed and Sealed this

Eighteenth Day of March, 2003

JAMES E. ROGAN
*Director of the United States Patent and Trademark Office*